(12) United States Patent
Angus

(10) Patent No.: US 8,762,990 B2
(45) Date of Patent: Jun. 24, 2014

(54) VIRTUAL MACHINES FOR AIRCRAFT NETWORK DATA PROCESSING SYSTEMS

(75) Inventor: Ian Gareth Angus, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 447 days.

(21) Appl. No.: 13/190,184

(22) Filed: Jul. 25, 2011

(65) Prior Publication Data
US 2013/0031543 A1 Jan. 31, 2013

(51) Int. Cl.
*G06F 9/455* (2006.01)

(52) U.S. Cl.
USPC ............... 718/1; 701/1; 701/3; 701/5; 701/14

(58) Field of Classification Search
None
See application file for complete search history.

(56) References Cited

U.S. PATENT DOCUMENTS

| | | | |
|---|---|---|---|
| 5,522,026 A * | 5/1996 | Records et al. ............... 715/710 |
| 6,671,589 B2 | 12/2003 | Holst et al. |
| 6,868,319 B2 | 3/2005 | Kipersztok et al. |
| 7,840,812 B1 | 11/2010 | Levenberg |
| 8,055,393 B2 | 11/2011 | Sims, III et al. |
| 8,132,233 B2 | 3/2012 | Gronholm et al. |
| 8,136,157 B2 | 3/2012 | Koyasu et al. |
| 8,185,609 B2 | 5/2012 | Fuchs et al. |
| 8,286,174 B1 * | 10/2012 | Schmidt et al. ............... 718/104 |
| 8,341,747 B2 * | 12/2012 | Cornwall et al. ............... 726/25 |
| 8,370,647 B2 | 2/2013 | Kitani |
| 8,458,695 B2 | 6/2013 | Fitzgerald et al. |
| 8,522,237 B2 | 8/2013 | Hotra |
| 8,572,613 B1 * | 10/2013 | Brandwine ................... 718/100 |
| 8,589,020 B1 | 11/2013 | Angus et al. |
| 8,615,384 B2 | 12/2013 | Angus et al. |
| 2003/0187878 A1 | 10/2003 | Sandifer |
| 2006/0020782 A1 | 1/2006 | Kakii |
| 2006/0080497 A1 | 4/2006 | Boning |
| 2006/0080519 A1 | 4/2006 | Boning |
| 2006/0090053 A1 | 4/2006 | Boning |
| 2006/0106836 A1 | 5/2006 | Masugi et al. |
| 2006/0112246 A1 | 5/2006 | Boning |
| 2006/0229772 A1 | 10/2006 | McClary |
| 2008/0140381 A1 | 6/2008 | Koyasu et al. |
| 2008/0184225 A1 * | 7/2008 | Fitzgerald et al. ................ 718/1 |
| 2009/0077626 A1 | 3/2009 | Leclercq et al. |
| 2009/0112569 A1 * | 4/2009 | Angus et al. ................... 703/22 |
| 2009/0138872 A1 | 5/2009 | Fuchs et al. |

(Continued)

OTHER PUBLICATIONS

Subar, "Mobile virtualization finds its home in the enterprise," Tech News and Analysis, Jun. 25, 201, pp. 1-13.

(Continued)

*Primary Examiner* — Emerson Puente
*Assistant Examiner* — Hiren Patel
(74) *Attorney, Agent, or Firm* — Yee & Associates, P.C.

(57) ABSTRACT

A method and apparatus are provided for operating a network data processing system on an aircraft. A number of operations are performed in a virtual machine on the aircraft. The virtual machine runs on a processor unit in the network data processing system on the aircraft to create a simulated computer environment. The virtual machine accesses resources of the processor unit for performing the number of operations using a host operating system on the processor unit. A current state of the aircraft is identified by the network data processing system. Running of the virtual machine is managed based on the current state of the aircraft and a policy for managing the virtual machine for different states of the aircraft.

11 Claims, 9 Drawing Sheets

(56) References Cited

U.S. PATENT DOCUMENTS

| | | | |
|---|---|---|---|
| 2009/0138874 A1 | 5/2009 | Beck et al. | |
| 2009/0150022 A1 | 6/2009 | McMillin et al. | |
| 2009/0187976 A1 | 7/2009 | Perroud et al. | |
| 2009/0198393 A1 | 8/2009 | Sims, III et al. | |
| 2009/0260006 A1 | 10/2009 | Hotra | |
| 2009/0289506 A1* | 11/2009 | Harres | 307/104 |
| 2010/0100887 A1 | 4/2010 | Beltrand | |
| 2010/0122343 A1 | 5/2010 | Ghosh et al. | |
| 2010/0161805 A1* | 6/2010 | Yoshizawa et al. | 709/226 |
| 2010/0199129 A1 | 8/2010 | Kitani | |
| 2010/0299742 A1 | 11/2010 | Declety et al. | |
| 2011/0004676 A1* | 1/2011 | Kawato | 709/221 |
| 2011/0071709 A1 | 3/2011 | Damiani et al. | |
| 2011/0173605 A1* | 7/2011 | Bourne | 717/176 |
| 2011/0219373 A1 | 9/2011 | Nam et al. | |
| 2011/0238239 A1* | 9/2011 | Shuler et al. | 701/3 |
| 2012/0131637 A1 | 5/2012 | Lum et al. | |
| 2012/0246698 A1 | 9/2012 | Lum et al. | |
| 2012/0254937 A1 | 10/2012 | Lum et al. | |
| 2012/0254938 A1 | 10/2012 | Lum et al. | |
| 2012/0254939 A1 | 10/2012 | Lum et al. | |
| 2013/0261853 A1* | 10/2013 | Shue et al. | 701/3 |
| 2013/0305391 A1 | 11/2013 | Haukom et al. | |

OTHER PUBLICATIONS

"What is Mobile Virtualization," Open Kernal Labs, pp. 1-2.
Combined Search and Examination Report, dated Oct. 24, 2012, regarding Application No. GB1211743.8, 6 pages.
Angus et al., "Verification of Devices Connected to Aircraft Data Processing System," U.S. Appl. No. 13/246,610, filed Sep. 27, 2011, 47 pages.
Angus et al., "Secure Partitioning of Devices Connected to Aircraft Network Data Processing System," U.S. Appl. No. 13/271,871, filed Oct. 12, 2011, 50 pages.
Non-final office action dated Mar. 1, 2013 regarding U.S. Appl. No. 13/306,528, 19 pages.
Notice of allowance dated Jul. 31, 2013 regarding U.S. Appl. No. 13/306,528, 12 pages.
Final office action dated Oct. 11, 2013 regarding U.S. Appl. No. 13/246,610, 12 pages.
Non-final office action dated Apr. 16, 2013 regarding U.S. Appl. No. 13/246,610, 15 pages.
Non-final office action dated Oct. 22, 2013 regarding U.S. Appl. No. 13/271,871, 23 pages.
Notice of allowance dated Dec. 16, 2013 regarding U.S. Appl. No. 13/271,871, 8 pages.
HAP Technology Overview: Trusted Computing Technologies Used in the High Assurance Platform, National Security Agency/Central Security Service, Jan. 2011, 1 page.
TCG Trusted Network Connect TNC Architecture for Interoperability, Trusted Computing Group Incorporated, Specification V. 1.4, Rev. 4, May 2009, 45 pages.
UK examination report dated Nov. 7, 2013 regarding application GB1211743.8, reference NAMM/P123215GB00, applicant The Boeing Company, 4 pages.

* cited by examiner

VIRTUAL MACHINES FOR AIRCRAFT NETWORK DATA PROCESSING SYSTEMS

BACKGROUND INFORMATION

1. Field

The present disclosure relates generally to aircraft and, in particular, to aircraft network data processing systems and software aircraft parts on aircraft. Still more particularly, the present disclosure relates to a method and apparatus for loading and operating a virtual machine on an aircraft network data processing system on an aircraft and for performing operations by a virtual machine on an aircraft or other vehicles.

2. Background

Modern aircraft are extremely complex. For example, an aircraft may have many types of electronic systems on-board. These systems are often in the form of line-replaceable units (LRUs). A line-replaceable unit is an item that can be removed and replaced from an aircraft. A line-replaceable unit is designed to be easily replaceable. A line-replaceable unit may be replaced when the aircraft is in flight or while the aircraft is on the ground. Line-replaceable units are typically packaged in a box and may be sealed.

A line-replaceable unit may take on various forms. A line-replaceable unit on an aircraft may be, for example, without limitation, a flight management system, an autopilot, an in-flight entertainment system, a communications system, a navigation system, a flight controller, a flight recorder, a collision avoidance system, a system to support maintenance functions, and a system to support crew processes. The various line-replaceable units on an aircraft may be parts of an aircraft network data processing system.

Line-replaceable units may use software or programming to provide the logic or control for various operations and functions. Typically, all software on an aircraft is treated as a separate part or is combined with a hardware part and is unchangeable without changing the hardware part number. Aircraft software that is treated as an aircraft part may be referred to as a loadable software aircraft part or a software aircraft part. Software aircraft parts are parts of an aircraft's configuration.

Aircraft operators are entities that operate aircraft. Aircraft operators also may be responsible for the maintenance and repair of aircraft. Examples of aircraft operators include airlines and military units. When an aircraft operator receives an aircraft, software aircraft parts may be already installed in the line-replaceable units on the aircraft.

An aircraft operator may also receive copies of these loaded software aircraft parts in case the parts need to be reinstalled or reloaded into the line-replaceable units on the aircraft. Reloading of software aircraft parts may be required, for example, if a line-replaceable unit in which the software is used is replaced or repaired. Further, the aircraft operator also may receive updates to the software aircraft parts from time to time. These updates may include additional features not present in the currently-installed software aircraft parts and may be considered upgrades to one or more line-replaceable units. Specified procedures may be followed during loading of a software aircraft part on an aircraft so that the current configuration of the aircraft, including all of the software aircraft parts loaded on the aircraft, is known.

In some cases, operations performed using some software aircraft parts may need to be isolated from operations performed using other software aircraft parts. In other cases, it may be desirable to control operations performed using some software aircraft parts based on a current state of the aircraft.

Current systems and methods for providing such isolation and for controlling operations in an aircraft network data processing system rely extensively on computer hardware. These current systems and methods may be less effective and efficient than desired. In particular, more hardware on an aircraft means more weight. More weight on an aircraft increases fuel consumption and, therefore, reduces the aircraft operating efficiency and increases aircraft operating costs.

Accordingly, it would be advantageous to have a method and apparatus that takes into account one or more of the issues discussed above, as well as possibly other issues.

SUMMARY

An advantageous embodiment of the present disclosure provides a method for operating a network data processing system on an aircraft. The method comprises performing a number of operations in a virtual machine on an aircraft. The virtual machine runs on a processor unit in the network data processing system on the aircraft to create a simulated computer environment and accesses resources of the processor unit for performing the number of operations using a host operating system on the processor unit. The method further comprises identifying, by the network data processing system, a current state of the aircraft, and managing the running of the virtual machine based on the current state of the aircraft and a policy for managing the virtual machine for different states of the aircraft.

Another advantageous embodiment of the present disclosure provides an apparatus comprising a first software aircraft part on a network data processing system on an aircraft. The first software aircraft part is a host operating system. The apparatus further comprises a number of second software aircraft parts on the network data processing system. The number of second software aircraft parts is configured to create a virtual machine. The apparatus further comprises a number of third software aircraft parts on the network data processing system. The number of third software aircraft parts is configured to perform a number of operations. The apparatus further comprises a processor unit on the network data processing system. The processor unit is configured to perform the number of operations in the virtual machine. The virtual machine is configured to run on the processor unit to create a simulated computer environment and to access resources of the processor unit for performing the number of operations using the host operating system on the processor unit. The apparatus further comprises a management module on the network data processing system. The management module is configured to manage the running of the virtual machine based on a current state of the aircraft and a policy for managing the virtual machine for different states of the aircraft.

Another advantageous embodiment of the present disclosure provides another method for operating a network data processing system on an aircraft. A first software aircraft part comprising a host operating system for a processor unit is loaded into transient storage in the network data processing system on the aircraft.

Software aircraft parts loaded into the transient storage are lost when the network data processing system is shut down. A second software aircraft part comprising a virtual machine template is loaded into the transient storage. The second software aircraft part is configured to provide virtual machine functions usable in a number of virtual machines having different configurations. A third software aircraft part comprising a configuration for a virtual machine is loaded into the transient storage. A number of fourth software aircraft parts configured to perform a number of operations are loaded into the transient storage. The host operating system and the virtual machine are run on the processor unit in the network data processing system on the aircraft from the first, second, and third software aircraft parts in the transient storage. The virtual machine comprises an instance of the virtual machine template having a configuration defined by the third software aircraft part. The number of operations are performed in the virtual machine using the number of fourth software aircraft parts in the transient storage. The virtual machine is configured to access resources of the processor unit for performing the number of operations using the host operating system on the processor unit.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
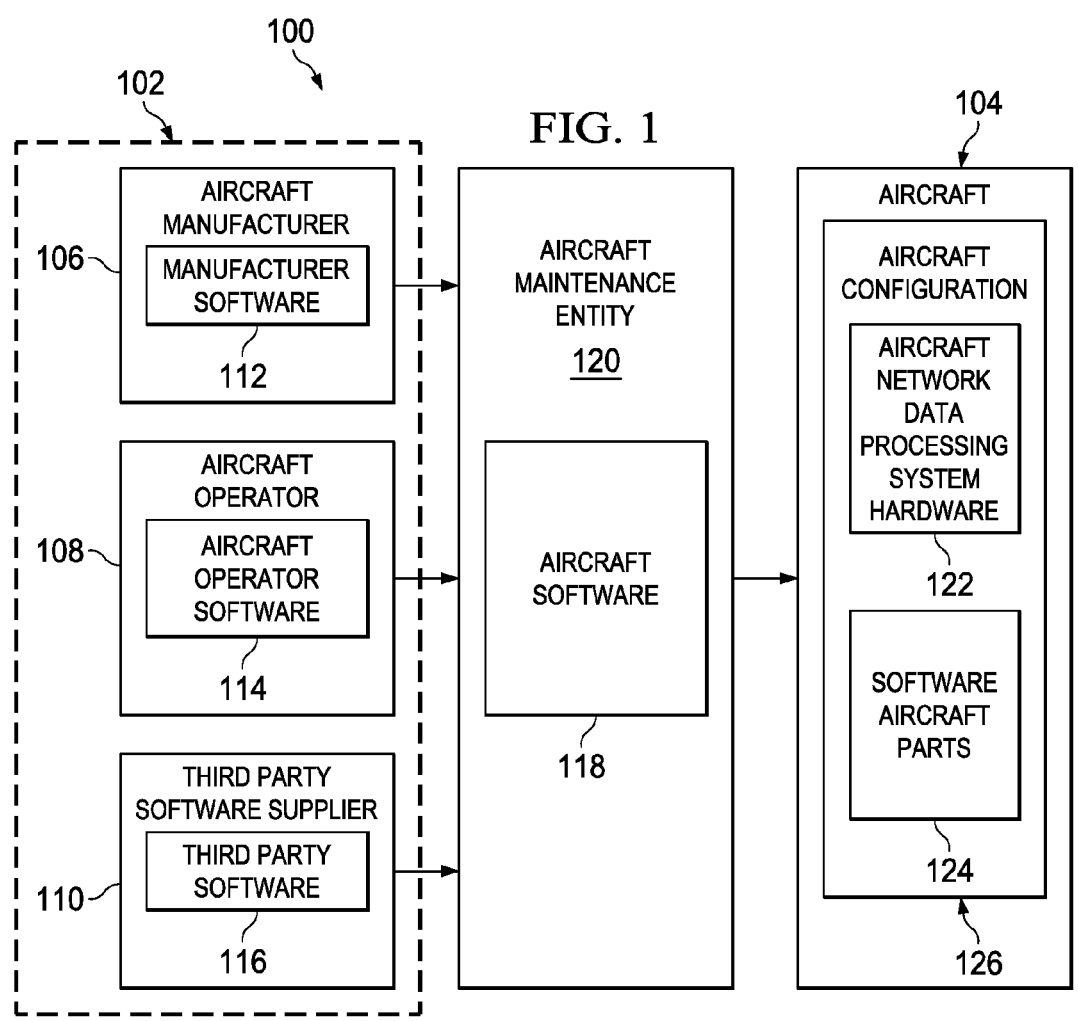
FIG. 1 is an illustration of a block diagram of a software aircraft part management environment for managing software parts on the ground and on an aircraft in accordance with an advantageous embodiment.

The different advantageous embodiments recognize and take into account a number of different considerations. "A number", as used herein with reference to items, means one or more items. For example, "a number of different considerations" are one or more different considerations.

The different advantageous embodiments recognize and take into account that an aircraft network data processing system may need to support software applications of various types from various sources. Some of these applications may be neither written nor certified by the aircraft manufacturer. Often, such applications may make use of commercial off-the-shelf software that was not written with aircraft use in mind. The different advantageous embodiments recognize and take into account that a way is needed to separate these applications from other applications running on the aircraft network data processing system so that there is no risk that these applications could interfere with the operation of certified applications on the aircraft.

The different advantageous embodiments recognize and take into account that current methods for separating operations in a network data processing system on an aircraft include running certain third party applications on separate computers. The different advantageous embodiments recognize and take into account that other methods for separating applications have relied upon applying specific and often onerous constraints in the form of applications that may be hosted on the aircraft network data processing system. For example, when software applications that may not be fully certified are to be hosted on a line-replaceable unit on an aircraft along with certified functions, the developers of such applications are forced to conform to very restrictive application programming interfaces and other technological constraints. Line-replaceable unit operating system permissions and scheduling then may be relied upon to contain the applications.

The different advantageous embodiments also recognize and take into account that any solution that overcomes the limitations of current systems and methods for separating operations on aircraft network data processing systems and controlling such operations based on aircraft states must adhere to accepted methodologies for loading data onto an aircraft. The different advantageous embodiments recognize and take into account that accepted methodologies require that software and other data is loaded onto the aircraft network data processing system as discrete software aircraft parts. The configuration of the aircraft may then be reported in terms of the software aircraft parts that are installed on the aircraft.

The different advantageous embodiments also recognize and take into account that virtualization of traditional computer operating systems has been used in fixed ground-based information technology systems. However, conventional virtualization has not been applied on aircraft, because conventional information technology approaches used in ground-based systems do not fit well with the packaging and management requirements for software used on an aircraft.

Thus, one or more of the advantageous embodiments provide a system and method for loading and operating virtual machines in a network data processing system on an aircraft. Virtual machines may be implemented on the aircraft using a number of software aircraft parts. Therefore, conventional methodologies for loading software onto an aircraft and maintaining an accurate record of the aircraft configuration may be employed. The use of virtual machines on the aircraft provides for the separation of operations in the aircraft network data processing system without the use of additional hardware or stringent limitations on software implementation. The running of the virtual machines on the aircraft may be managed based on the current state of the aircraft. In this manner, policies restricting operations that may be performed on the aircraft network data processing system with respect to certain aircraft states may be effectively and efficiently implemented.

Turning to FIG. 1, a block diagram of a software aircraft part management environment for managing software parts on the ground and on an aircraft is depicted in accordance with an advantageous embodiment. In this example, software aircraft part management environment 100 may include number of software suppliers 102. Number of software suppliers 102 provides software applications or other software for use on aircraft 104. Number of software suppliers 102 may include any entity that develops or otherwise supplies software for use on aircraft 104. For example, without limitation, number of software suppliers 102 may include aircraft manufacturer 106, aircraft operator 108, and third party software supplier 110. Aircraft manufacturer 106 manufactures aircraft 104 and provides manufacturer software 112. Aircraft operator 108 operates aircraft 104 and provides aircraft operator software 114. Aircraft operator 108 may be, without limitation, an airline, military organization, or any other private or government organization that operates aircraft 104. Third party software supplier 110 provides third party software 116.

Manufacturer software 112 and aircraft operator software 114 typically may be designed specifically for use on aircraft 104. Therefore, manufacturer software 112 and aircraft operator software 114 is typically certified for use on aircraft 104. Third party software supplier 110 may provide third party software 116 specifically designed for use on aircraft 104. Alternatively, third party software 116 may include commercial off-the-shelf software. Third party software 116 may or may not be certified for use on aircraft 104.

Manufacturer software 112, aircraft operator software 114, and third party software 116 together form aircraft software 118 for use on aircraft 104. Aircraft maintenance entity 120 in software aircraft part management environment 100 loads aircraft software 118 on aircraft 104. Aircraft maintenance entity 120 may be any entity that is responsible for loading aircraft software 118 on aircraft 104. For example, aircraft maintenance entity 120 may include aircraft manufacturer 106 or aircraft operator 108. Aircraft maintenance entity 120 may or may not be the owner of aircraft 104. Aircraft maintenance entity 120 may include an entity acting on behalf of the owner of aircraft 104 to load aircraft software 118 on aircraft 104. In any case, it is assumed that aircraft maintenance entity 120 has authority to load aircraft software 118 on aircraft 104.

Aircraft 104 may be a commercial or private passenger or cargo aircraft or a military or other government aircraft. Aircraft 104 may include aircraft network data processing system hardware 122. Aircraft software 118 may be loaded onto aircraft 104 in the form of software aircraft parts 124. Aircraft network data processing system hardware 122 and software aircraft parts 124 together define aircraft configuration 126. Software aircraft parts 124 may be loaded onto aircraft 104 by aircraft maintenance entity 120. Aircraft maintenance entity 120 may follow specified procedures for loading of software aircraft parts 124 on aircraft 104 so that aircraft configuration 126, including all software aircraft parts 124 currently installed on aircraft 104, is known.

Software aircraft parts 124 may be run on aircraft network data processing system hardware 122 to perform various operations. These operations may affect the performance or safety of aircraft 104. Operations performed using software aircraft parts 124 that are not specifically designed for aircraft 104 or that are not certified for use on aircraft 104 in particular may affect other operations on aircraft 104 in an unwanted manner.

Therefore, separating the performance of some operations on aircraft 104 from the performance of other operations on aircraft 104 may be desirable. Separating the operations may reduce the potential for unwanted effects during operation of aircraft 104. Furthermore, restricting the performance of some operations on aircraft 104 during certain states of operation of aircraft 104 also may be desirable. For example, it may be desirable to restrict the performance of some operations on aircraft 104 when aircraft 104 is in a state where any unwanted effects of such operations are most likely to occur or most likely to be significant.

Figure 2:
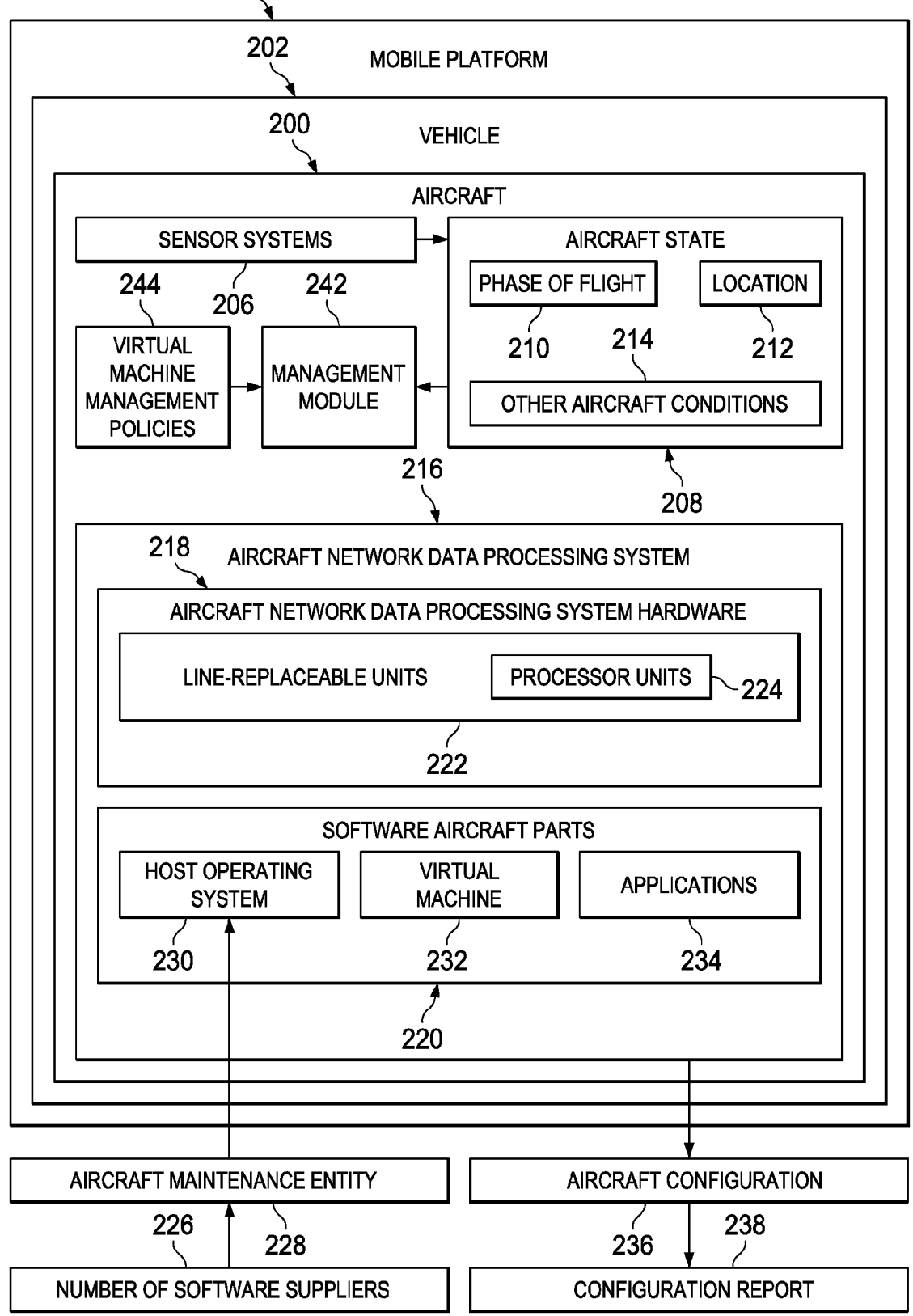
FIG. 2 is an illustration of a block diagram of an aircraft in accordance with an advantageous embodiment.

Turning to FIG. 2, a block diagram of an aircraft is depicted in accordance with an advantageous embodiment. In this example, aircraft 200 is an example of one implementation of aircraft 104 in FIG. 1. Aircraft 200 is an example of vehicle 202 in which advantageous embodiments may be implemented. Vehicle 202 may be another type of aerospace vehicle, such as a spacecraft or any other vehicle that is capable of traveling through the air, in space, or both. Vehicle 202 may also be a ground vehicle or a water vehicle, such as a train, a surface ship, or a submarine. Vehicle 202 is an example of one type of mobile platform 204 in which advantageous embodiments may be implemented.

Aircraft 200 may comprise sensor systems 206. Sensor systems 206 may include various systems on aircraft 200 for identifying aircraft state 208. For example, without limitation, aircraft state 208 may include phase of flight 210, location 212, and other aircraft conditions 214. For example, without limitation, sensor systems 206 for identifying phase of flight 210 may comprise a pitot tube; a temperature sensor; an altimeter; landing gear sensors that indicate whether landing gear are extended or retracted and whether landing gear are in contact with the ground; sensors to identify the positions of various aircraft control surfaces, such as flaps, ailerons, and the like; and other sensor systems. For example, without limitation, sensor systems 206 for identifying location 212 may include a global positioning system receiver, an inertial navigation unit, or other systems for determining location 212. Sensor systems 206 may include other appropriate systems for identifying other aircraft conditions 214.

Aircraft 200 includes aircraft network data processing system 216. Aircraft network data processing system 216 also may be referred to as an on-board network system. Aircraft network data processing system 216 includes aircraft network data processing system hardware 218 and software aircraft parts 220. Software aircraft parts 220 may be loaded onto aircraft network data processing system hardware 218 and may be run on aircraft network data processing system hardware 218 to perform various operations.

Aircraft network data processing system hardware 218 may comprise various hardware devices or systems that are connected together in any appropriate network architecture to form aircraft network data processing system 216. Aircraft network data processing system hardware 218 may include line-replaceable units 222. For example, without limitation, aircraft network data processing system hardware 218, including line-replaceable units 222, may include data processing systems, routers, or other devices or systems with processors that run software in the form of software aircraft parts 220. In particular, aircraft network data processing system hardware 218, including line-replaceable units 222, may include processor units 224 for running software aircraft parts 220 to perform various operations.

Software aircraft parts 220 may be developed or otherwise provided by number of software suppliers 226. Software aircraft parts 220 from number of software suppliers 226 may be loaded into aircraft network data processing system 216 by aircraft maintenance entity 228. In this example, number of software suppliers 226 is an example of number of software suppliers 102 in FIG. 1, and aircraft maintenance entity 228 is an example of aircraft maintenance entity 120 in FIG. 1.

Software aircraft parts 220 may include host operating system 230, software aircraft parts to create virtual machine 232, and software aircraft parts to perform operations for various applications 234. Host operating system 230 may be referred to as a first software aircraft part. Software aircraft parts to create virtual machine 232 may be referred to as second software aircraft parts. Software aircraft parts for applications 234 may be referred to as third software aircraft parts.

Host operating system 230 may be an operating system for one of processor units 224. Virtual machine 232 runs on one of processor units 224 to create a simulated computer environment. Operations for applications 234 are performed on virtual machine 232. Virtual machine 232 accesses resources of one of processor units 224 on which it is running to perform the operations for applications 234. Virtual machine 232 accesses resources of one of processor units 224 on which it is running using host operating system 230.

Virtual machine 232 is a software implementation of a machine that executes programs, such as a physical machine. Therefore, applications 234 may be run on virtual machine 232 as if they were running directly on physical hardware. However, virtual machine 232 provides an isolated operating system installation within host operating system 230. Access to resources of one of processor units 224 on which applications 234 are running may be managed at a more restrictive level for virtual machine 232. Therefore, operations performed in virtual machine 232 may be separated from other operations performed on one of processor units 224. Separating the operations may prevent the operations performed in virtual machine 232 from affecting other operations in unwanted ways.

Aircraft configuration 236 includes aircraft network data processing system hardware 218 and software aircraft parts 220 that are on aircraft 200. Aircraft configuration 236 may be recorded and reported in configuration report 238. For example, configuration report 238 may identify line-replaceable units 222 and software aircraft parts 220 on aircraft 200 that form aircraft configuration 236.

In accordance with an illustrative example, virtual machine 232 may be used to run software aircraft parts 220 in the same manner as a line-replaceable hardware unit. Therefore, virtual machine 232 may be identified as a line-replaceable unit in configuration report 238 for aircraft 200.

Management module 242 may manage the running of virtual machine 232 based on a current aircraft state 208 and virtual machine management policies 244. Virtual machine management policies 244 may indicate how or if virtual machine 232 is to be run for different aircraft states. For example, virtual machine management policies 244 may indicate that virtual machine 232 should be running for a particular aircraft state 208 or that virtual machine 232 should not be running for a particular aircraft state 208. If virtual machine 232 should be running for a particular aircraft state 208, virtual machine management policies 244 may indicate parameters of operation of virtual machine 232 for that aircraft state 208. For example, virtual machine management policies 244 may indicate the resources of aircraft network data processing system 216 that virtual machine 232 may access for a particular aircraft state 208.

Management module 242 may be implemented in aircraft network data processing system 216. Management module 242 may be implemented in hardware, in software, or in a combination of hardware and software. Virtual machine management policies 244 may be stored in a database or any appropriate data structure. Alternatively or additionally, virtual machine management policies 244 may be implemented as software algorithms, hardware structures, or both software algorithms and hardware structures configured to implement virtual machine management policies 244. Virtual machine management policies 244 may be implemented as part of management module 242 or separate from, but accessible by, management module 242. Management module 242 and virtual machine management policies 244 may be implemented as a number of software aircraft parts 220.

The illustration of FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, individual software parts may include software for performing various functions. Multiple individual software parts may be used in combination to perform higher level functions. For example, one or more of host operating system 230, virtual machine 232, and applications 234 may comprise multiple software aircraft parts 220. On the other hand, software for performing multiple higher-level functions may be included in the same software part. For example, a single one of software aircraft parts 220 may be configured to perform functions for various combinations of host operating system 230, virtual machine 232, and applications 234.

Aircraft network data processing system 216 may comprise multiple physical processor units 224 networked together. In accordance with an advantageous embodiment, multiple virtual machines may be implemented on the multiple networked processor units to perform various operations. In this case, the virtual machines across multiple processor units 224 may be formed in a number of virtual networks that are overlaid on the physical network. The virtual machines and virtual networks may be separated from the physical processor units 224 and the aircraft network data processing system hardware 218 forming the physical network. In this embodiment, virtual machines may be migrated from one physical processor unit to another as desired.

Figure 3:
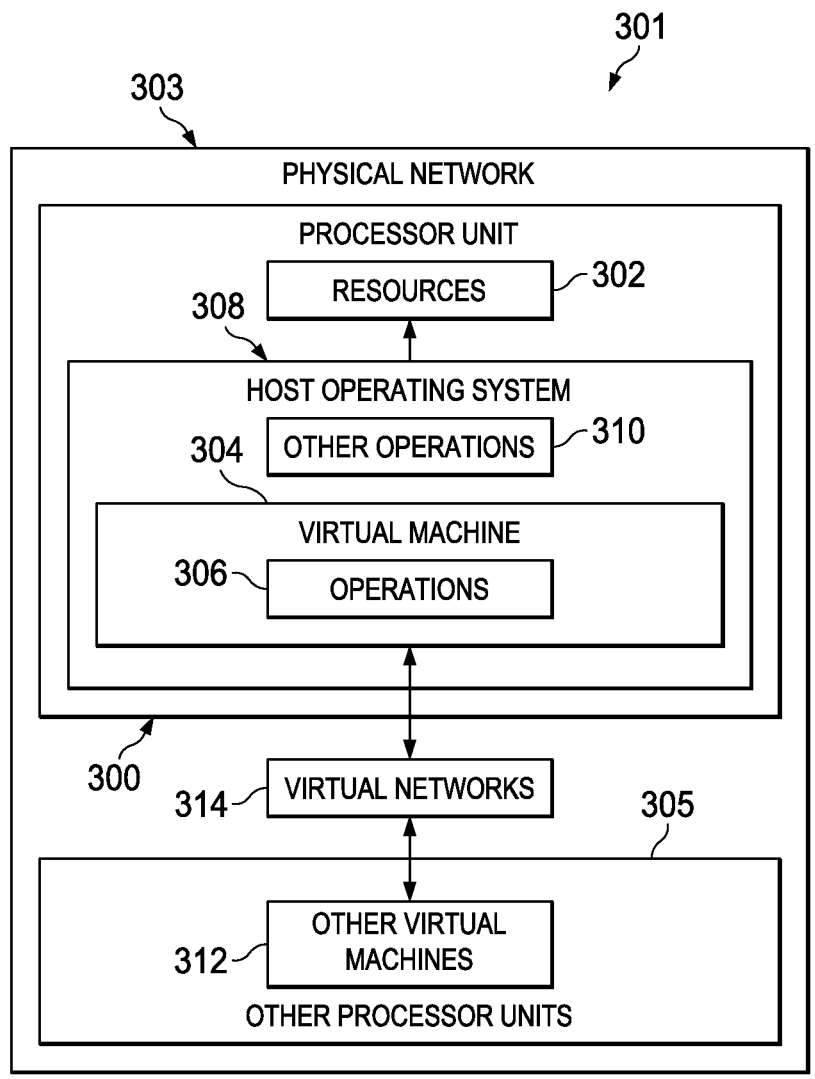
FIG. 3 is an illustration of a block diagram of an aircraft network data processing system in accordance with an advantageous embodiment.

Turning to FIG. 3, a block diagram of an aircraft network data processing system is depicted in accordance with an advantageous embodiment. In this example, aircraft network data processing system 301 is an example of one implementation of aircraft network data processing system 216 in FIG. 2. Aircraft network data processing system 301 comprises physical network 303. Physical network 303 may be implemented using a combination of networking hardware and software. Multiple processor units may be networked together in physical network 303. In this example, physical network 303 comprises processor unit 300 and a number of other processor units 305. Processor unit 300 is an example of one implementation of processor units 224 in FIG. 2.

Processor unit 300 provides various resources 302. Resources 302 may include resources that are provided by processor unit 300 itself or that are provided by processor unit 300 via a connection of processor unit 300 to resources 302. For example, without limitation, resources 302 may include physical system resources, such as network access, a display or other output device, a keyboard or other input device, and disk storage or another form of storage device or memory.

Virtual machine 304 runs on processor unit 300 to create a simulated computer environment. A number of operations 306 are performed in virtual machine 304. Virtual machine 304 accesses resources 302 for performing number of operations 306. Virtual machine 304 accesses resources 302 using host operating system 308 on processor unit 300.

Other operations 310 may be performed in processor unit 300 at the same time as operations 306. Other operations 310 are not performed in virtual machine 304. However, other operations 310 also may access resources 302 using host operating system 308. In one advantageous embodiment, other operations 310 may include other virtual machines running on processor unit 300. Virtual machine 304 provides separation between operations 306 and other operations 310 so that operations 306 do not affect other operations 310 in an unacceptable way, even though operations 306 and other operations 310 may be performed on the same processor unit 300 at the same time.

Virtual machine 304 may be stopped without also stopping host operating system 308. For purposes of the present application, including the claims, stopping a virtual machine or other operating system may include any action or series of actions that causes any operations that are being performed in the virtual machine to stop being performed in the virtual machine either temporarily or permanently. For example, without limitation, stopping virtual machine 304 may include pausing performance of operations 306 in virtual machine 304 without removing virtual machine 304 from processor unit 300.

Alternatively, stopping virtual machine 304 may include removing virtual machine 304 from processor unit 300 or any other action whereby the performance of operations 306 in virtual machine 304 is temporarily or permanently stopped. As another example, stopping virtual machine 304 may comprise suspending operation of virtual machine 304. In this case, for purposes of the present application, including the claims, starting virtual machine 304 may comprise resuming operation of virtual machine 304.

When virtual machine 304 is stopped without also stopping host operating system 308, performance of operations 306 will stop while performance of other operations 310, including running other virtual machines, may continue. Thus, performing operations 306 in virtual machine 304 provides a convenient way to selectively stop performance of some operations 306 without also stopping performance of other operations 310 on the same processor unit 300 in an aircraft network data processing system.

For example, it may be desirable to stop performance of operations 306 if a particular current state of the aircraft is identified. Performance of operations 306 may be restarted in response to a subsequent further change in the state of the aircraft. In this case, operations 306 may be restarted by restarting virtual machine 304. Performing operations 306 in virtual machine 304 provides a way to restart operations 306 more quickly and efficiently in response to a change in the current state of the aircraft than would be possible if restarting operations 306 required restarting a computer or other hardware platform on which operations 306 were implemented.

Use of virtual machines in an aircraft network data processing system is not limited to a single processor unit. Other virtual machines 312 may be running on other processor units 305 in physical network 303 to perform various operations. In accordance with an advantageous embodiment, virtual machine 304 may be connected to other virtual machines 312 via a number of virtual networks 314. In this case, virtual networks 314 are overlaid on physical network 303. Virtual networks 314 are separated from physical network 303 in the way that virtual machine 304 and other virtual machines 312 are separated from the underlying physical processor unit 300 and other processor units 305, respectively. In this embodiment, virtual machines may be migrated between physical processor units as desired.

Figure 4:
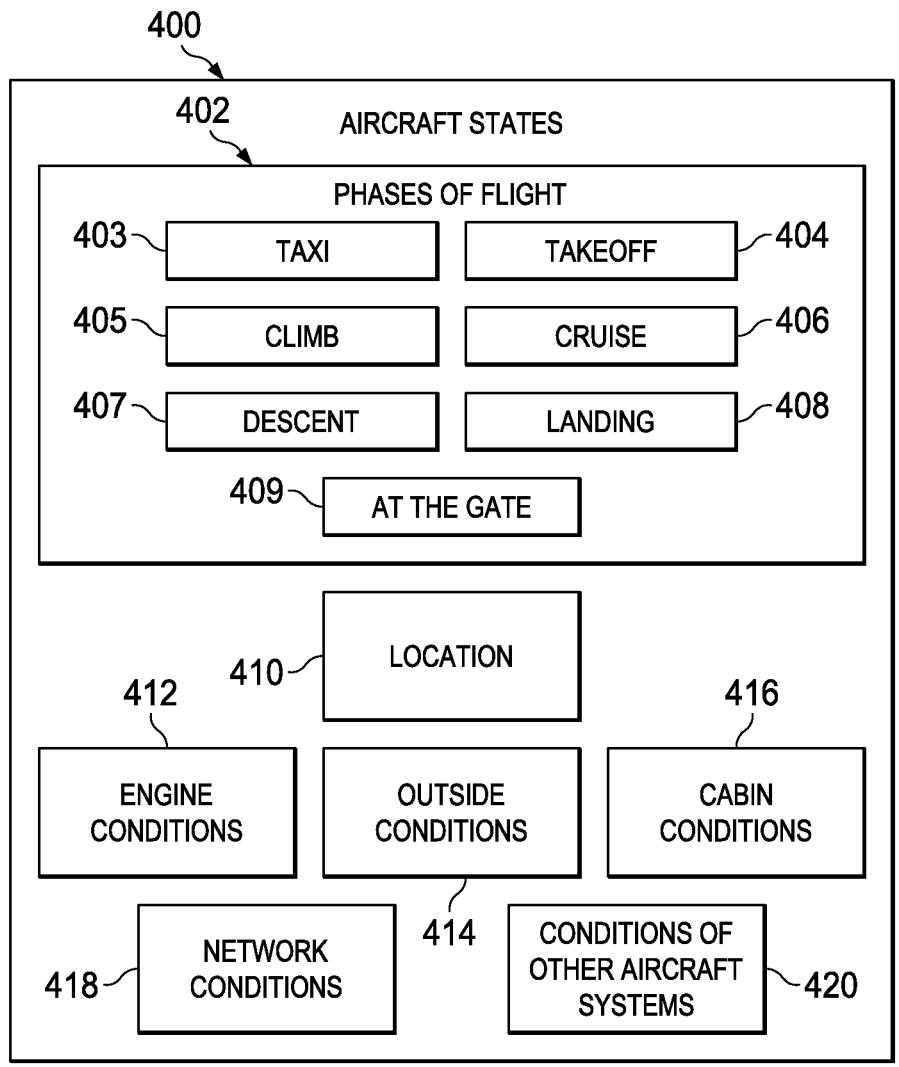
FIG. 4 is an illustration of a block diagram of aircraft states in accordance with an advantageous embodiment.

Turning to FIG. 4, a block diagram of aircraft states is depicted in accordance with an advantageous embodiment. In this example, aircraft states 400 is an example of states for aircraft state 208 in FIG. 2.

Aircraft states 400 may include various phases of flight 402 of an aircraft. For example, phases of flight 402 may include, without limitation, at least one of taxi 403, takeoff 404, climb 405, cruise 406, descent 407, landing 408, and at the gate 409. Aircraft states 400 may include location 410 of the aircraft. Location 410 may include the geographic location of the aircraft. Location 410 also may include other parameters related to the location of the aircraft in space, such as the altitude or orientation of the aircraft in space.

Aircraft states 400 also may include, without limitation, engine conditions 412, outside conditions 414, cabin conditions 416, network conditions 418, and conditions of other aircraft systems 420. For example, without limitation, engine conditions 412 may comprise at least one of engine temperature, engine pressure, and other engine parameters at one or more locations within an engine of the aircraft. For example, without limitation, outside conditions 414 may comprise at least one of temperature, pressure, and other conditions outside of the aircraft.

Cabin conditions 416 may comprise, for example, without limitation, at least one of temperature, pressure, and other conditions within the aircraft passenger or crew cabin, or both. For example, without limitation, network conditions 418 may include conditions on the aircraft network data processing system, such as the volume of data traffic on the network, the presence or absence of various alerts, or other parameters indicating conditions in the aircraft network data processing system, such as whether the aircraft is in a data load or maintenance mode.

Figure 5:
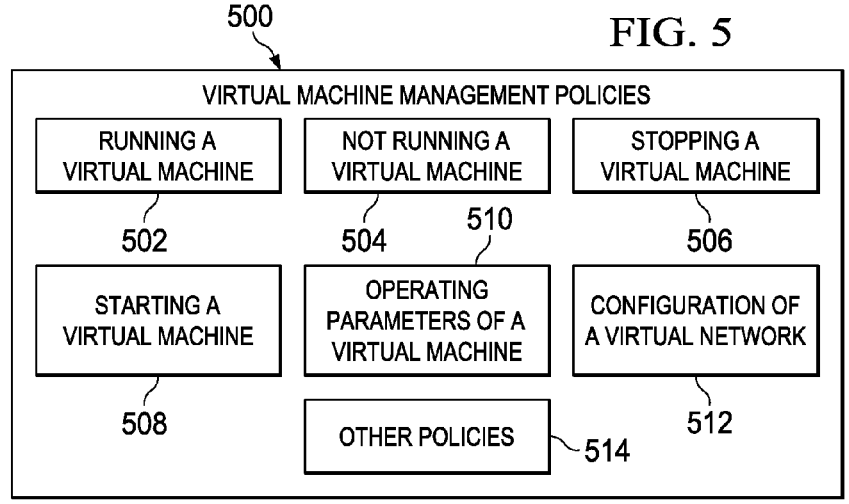
FIG. 5 is an illustration of a block diagram of virtual machine management policies in accordance with an advantageous embodiment.

Turning to FIG. 5, a block diagram of virtual machine management policies is depicted in accordance with an advantageous embodiment. In this example, virtual machine management policies 500 is an example of one implementation of virtual machine management policies 244 in FIG. 2. Virtual machine management policies 500 define policies for managing the running of a number of virtual machines on a network data processing system on an aircraft with respect to states of the aircraft. For example, virtual machine management policies 500 may define whether or not particular virtual machines on an aircraft network data processing system should be running for a particular aircraft state. If a particular virtual machine should be running for a particular aircraft state, virtual machine management policies 500 may define the parameters of operation of the virtual machine for that aircraft state. Virtual machine management policies 500 may be defined with respect to a current aircraft state or with respect to changes in a current aircraft state, or both.

For example, without limitation, virtual machine management policies 500 may include policies for running a virtual machine 502 or not running a virtual machine 504 for identified current aircraft states. Virtual machine management policies 500 may include policies for stopping a virtual machine 506 and starting a virtual machine 508 in response to identified changes in the current aircraft state.

Virtual machine management policies 500 may include policies defining operating parameters of a virtual machine 510 for a given current aircraft state. For example, without limitation, policies defining operating parameters of a virtual machine 510 may include policies defining allowed access by a virtual machine to resources in the aircraft network data processing system for a given current aircraft state.

Virtual machine management polices 500 may include policies defining configuration of a virtual network 512 for a given current aircraft state. Virtual machine management policies 500 also or alternatively may include other policies 514 for managing the running of virtual machines in the aircraft network data processing system based on the current state of the aircraft or a change in the current state of the aircraft, or both.

For example, without limitation, certain software aircraft parts on a network data processing system on an aircraft may perform operations that provide interfaces to the aircraft network data processing system for wireless devices used by passengers in the passenger cabin of a commercial aircraft. These operations may not be considered operations that are critical to the safe and effective operation of the aircraft. The software aircraft parts for implementing these operations may include commercial off-the-shelf software or otherwise may include software that may not be fully certified for use in an aircraft.

In accordance with an advantageous embodiment, these operations may be performed in a virtual machine on the aircraft network data processing system. Performing these operations on a virtual machine separates these operations from other operations on the aircraft network data processing system so that the operations supporting wireless device use by aircraft passengers do not affect other potentially more-critical operations in unwanted ways.

It may be desired that wireless device use by aircraft passengers is not supported during certain aircraft states. For example, during certain aircraft phases of flight, wireless device use by aircraft passengers may be more likely to interfere with aircraft operation. In this case, virtual machine management policies 500 may be established for running a virtual machine 502 performing the operations supporting wireless use by the passengers only during some phases of flight and for otherwise not running a virtual machine 504 during other phases of flight.

For example, without limitation, virtual machine management policies 500 may indicate a policy for running a virtual machine 502 if the current state of the aircraft indicates a phase of flight of cruise or at the gate. If the current aircraft state indicates either of these phases of flight and the virtual machine is not already running, the virtual machine may be started automatically.

Virtual machine management policies 500 may indicate a policy for not running a virtual machine 504 if the current state of the aircraft indicates a phase of flight of taxi, takeoff, climb, descent, or landing. If the current aircraft state indicates any one of these phases of flight and the virtual machine is running, the virtual machine may be stopped automatically.

Figure 6:
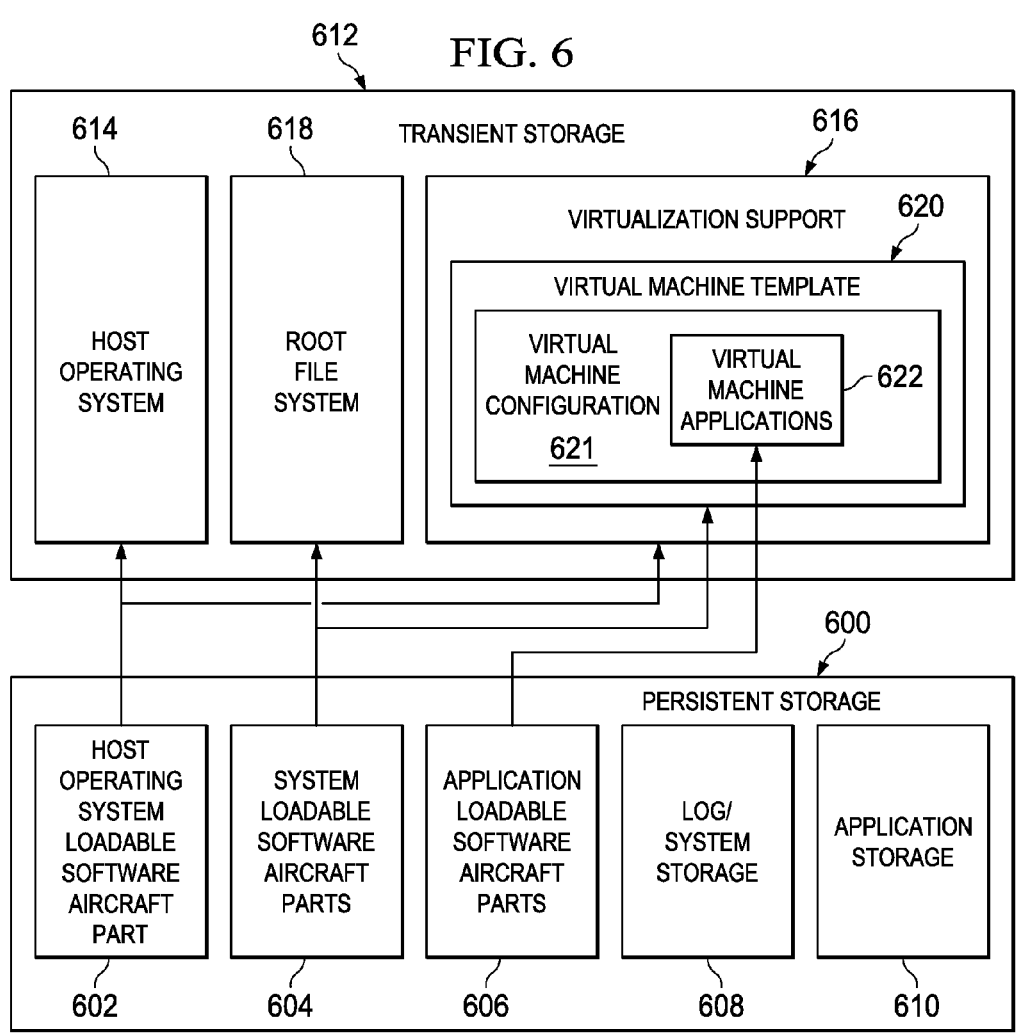
FIG. 6 is an illustration of a block diagram of loadable software aircraft parts in an aircraft network data processing system in accordance with an advantageous embodiment.

Turning to FIG. 6, a block diagram of loadable software aircraft parts in an aircraft network data processing system is depicted in accordance with an advantageous embodiment. Initially, loadable software aircraft parts for an aircraft may be installed in persistent storage 600 on the aircraft. For example, without limitation, persistent storage 600 may be a disk or other persistent storage device or devices on the aircraft network data processing system. Loadable software aircraft parts may be installed in persistent storage 600 by an authorized aircraft maintenance entity using approved procedures for installing software aircraft parts on aircraft to maintain the integrity of the aircraft configuration.

For example, without limitation, loadable software aircraft parts loaded in persistent storage 600 may include host operating system loadable software aircraft part 602, system loadable software aircraft parts 604, and application loadable software aircraft parts 606. Log/system storage 608 and application storage 610 also may be provided in persistent storage 600 on the aircraft network data processing system.

To perform operations, loadable software aircraft parts are loaded from persistent storage 600 into transient storage 612. Transient storage 612 also may be referred to as memory, temporary storage, or temporary memory. For example, without limitation, transient storage 612 may include memory or other transient storage associated with a processor unit on the aircraft network data processing system.

Transient storage 612 may also include memory that has been temporarily swapped out to a swap partition on persistent storage 600. Memory that is swapped out in this manner may be managed by the main host operating system. Therefore, transient storage 612 need not be limited to the size of physical memory. Software aircraft parts loaded into transient storage 612 are lost when the aircraft network data processing system is shut down.

Host operating system loadable software aircraft part 602 is loaded in transient storage 612 to provide host operating system 614 for the processor unit. Depending on the operating system used, host operating system loadable software aircraft part 602 may include virtualization support 616. Virtualization support 616 supports the creation and operation of a virtual machine on the processor unit. If virtualization support 616 is not provided with host operating system loadable software aircraft part 602, virtualization support 616 may be loaded in transient storage 612 separately, such as from system loadable software aircraft parts 604. System loadable software aircraft parts 604 also may be loaded in root file system 618 in transient storage 612.

Virtual machine template 620 may be loaded in transient storage 612 from system loadable software aircraft parts 604. Specifically, virtual machine template 620 may be loaded in transient storage 612 from a virtual machine template software aircraft part that is one of system loadable software aircraft parts 604. Virtual machine template 620 is configured to provide virtual machine functions usable in a number of virtual machines having different configurations. A virtual machine is created by creating an instance of virtual machine template 620 having the desired configuration.

Virtual machine configuration 621 may be loaded in transient storage 612 as a configuration software aircraft part from system loadable software aircraft parts 604. Application loadable software aircraft parts 606 may be loaded in transient storage 612 to provide virtual machine applications 622 to perform a number of operations in a virtual machine. Although virtual machines are in transient storage 612, the virtual machines may be given a limited ability to write to persistent storage 600 if needed.

Figure 7:
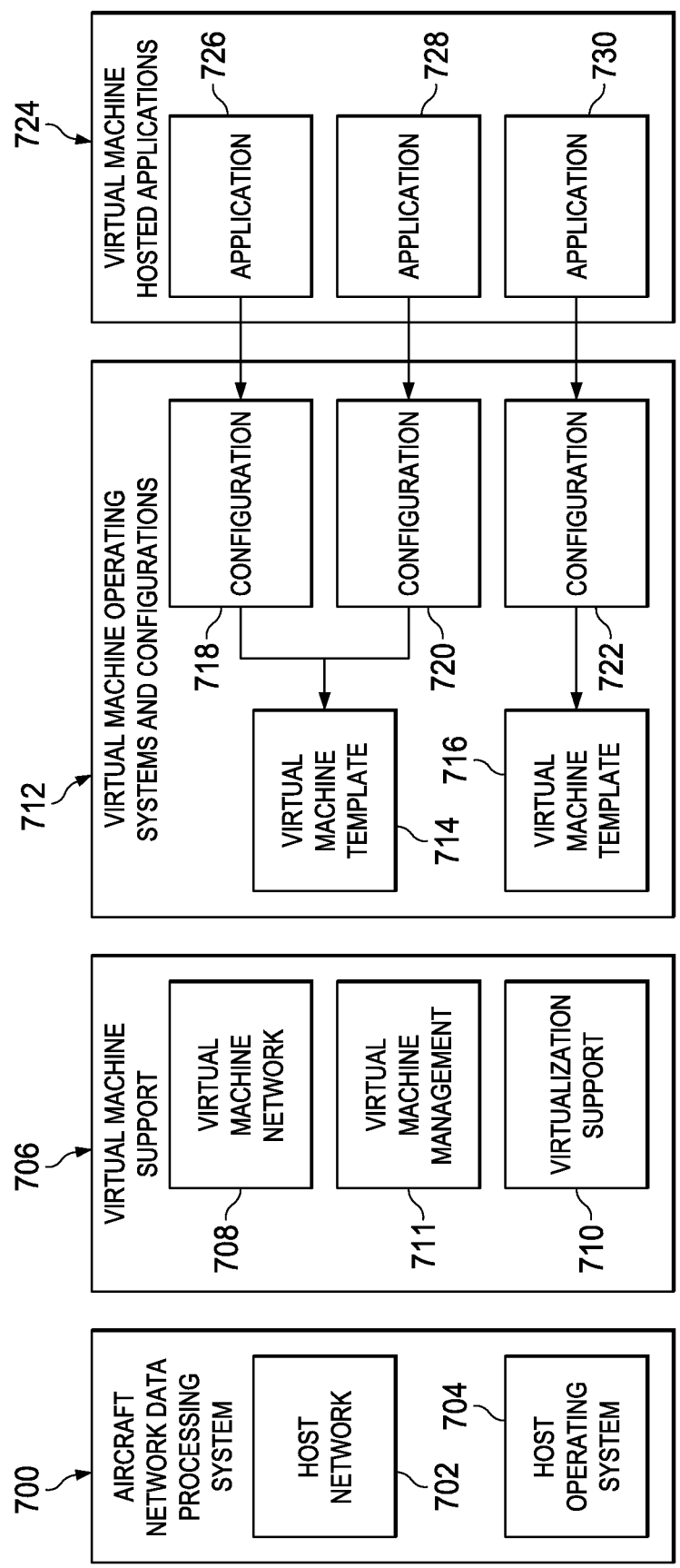
FIG. 7 is an illustration of a block diagram of software aircraft part dependencies in accordance with an advantageous embodiment.

Turning to FIG. 7, a block diagram of software aircraft part dependencies is depicted in accordance with an advantageous embodiment. In this example, the software aircraft part dependencies shown in FIG. 7 may be one example of the relationship between software aircraft parts 220 in FIG. 2.

In this example, a first category of software aircraft parts includes software aircraft parts for a host level of aircraft network data processing system 700. Software aircraft parts for aircraft network data processing system 700 may include a number of software aircraft parts for configuring host network 702 and a number of software aircraft parts for host operating system 704. For example, host operating system 704 may be the operating system for a processor unit in aircraft network data processing system 700 on which a virtual machine is to be run.

A second category of software aircraft parts includes software aircraft parts for virtual machine support 706. Software aircraft parts for virtual machine support 706 may include a number of software aircraft parts for configuring virtual machine network 708, a number of software aircraft parts for virtualization support 710, and a number of software aircraft parts for virtual machine management 711.

Virtual machine network 708 is a network for virtual machines as seen by the host system. Virtual machine network 708 provides network isolation of virtual machines and restricts the resources and services that a virtual machine may access. Virtual machine management 711 may include the functionality provided by a management module using virtual machine management policies as described above. Some or all of the functionality provided by the software aircraft parts for virtual machine support 706 may be included in the host software aircraft parts for aircraft network data processing system 700.

A third category of software aircraft parts includes software aircraft parts for virtual machine operating systems and configurations 712. In this example, software aircraft parts for virtual machine operating systems include software aircraft parts for virtual machine template 714 and virtual machine template 716. A virtual machine template defines a basic virtual machine image. A virtual machine template provides functionality that may be used in a number of virtual machines having different configurations. A virtual machine template includes mechanisms for integrating applications for the virtual machine.

In this example, software aircraft parts for virtual machine configurations include software aircraft parts for configuration 718, configuration 720, and configuration 722. A virtual machine configuration defines virtual machine unique configuration items, including the network as seen by the virtual machine. The virtual machine configuration may also include a list of applications that the configuration is going to want to load into the virtual machine.

In this example, configuration 718 is used with virtual machine template 714 to create a first virtual machine. Configuration 720 is used with virtual machine template 714 to create a second virtual machine. Configuration 722 is used with virtual machine template 716 to create a third virtual machine. A software aircraft part for a single virtual machine template may be used to create a number of virtual machines having various same or different configurations. The configurations themselves may comprise software aircraft parts.

A fourth category of software aircraft parts includes software aircraft parts for virtual machine hosted applications 724. In this example, software aircraft parts for virtual machine hosted applications 724 include software aircraft parts for application 726, application 728, and application 730. In this example, application 726 is run to perform operations on a virtual machine with configuration 718. Application 728 is run to perform operations on a virtual machine with configuration 720. Application 730 is run to perform operations on a virtual machine with configuration 722. A number of different applications may be run to perform operations on a single virtual machine configuration.

Figure 8:
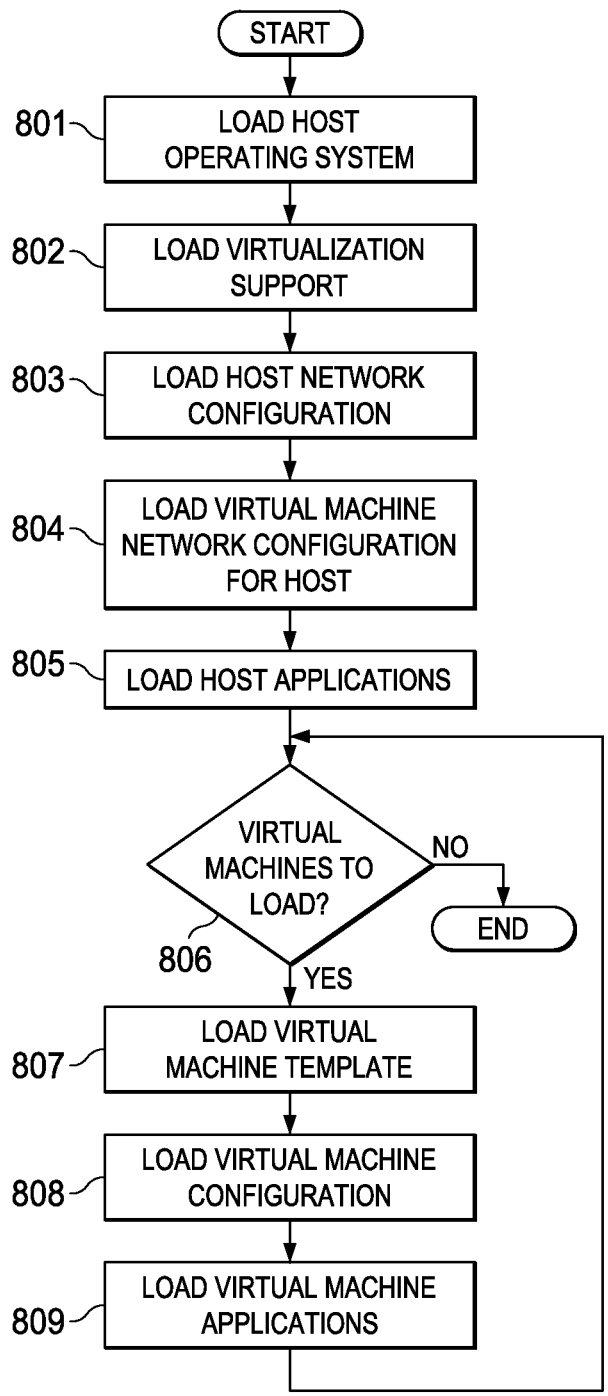
FIG. 8 is an illustration of a flowchart of a process for loading software aircraft parts into transient storage in an aircraft network data processing system in accordance with an advantageous embodiment.

Turning to FIG. 8, a flowchart of a process for loading software aircraft parts into transient storage in an aircraft network data processing system is depicted in accordance with an advantageous embodiment. The process of FIG. 8 may be implemented in aircraft network data processing system 216 in FIG. 2.

The process begins with loading a host operating system (operation 801). The host operating system may include support for virtualization. If the host operating system does not include support for virtualization, virtualization support is loaded (operation 802). If the host operating system does include support for virtualization, operations 801 and 802 are combined into a single operation. A host network configuration is then loaded (operation 803), and a virtual machine network configuration for the host is loaded (operation 804). Host applications are then loaded (operation 805).

It may then be determined whether or not there are virtual machines to load (operation 806). For example, there may be a number of virtual machines to load if any applications are to be run on virtual machines in the aircraft network data processing system. Operation 806 may include determining whether or not there are virtual machines to load based on a current state of the aircraft and virtual machine management policies. For example, virtual machine management policies may define which, if any, virtual machines may be loaded for a given current state of the aircraft. If it is determined at operation 806 that there are no virtual machines to load, the process terminates.

If it is determined at operation 806 that there are virtual machines to load, a virtual machine template is loaded (operation 807). The configuration of the virtual machine required to run a particular virtual machine application defines the virtual machine template to load. The virtual machine configuration is loaded (operation 808), and virtual machine applications are loaded (operation 809). The process then returns to operation 806 to determine whether there are any more virtual machines to load. Operations 807, 808, and 809 may be repeated to load virtual machines as long as it is determined at operation 806 that there are virtual machines to load. Multiple operations 807, 808, and 809 may be performed concurrently to load a multiple number of virtual machines at the same time.

Figure 9:
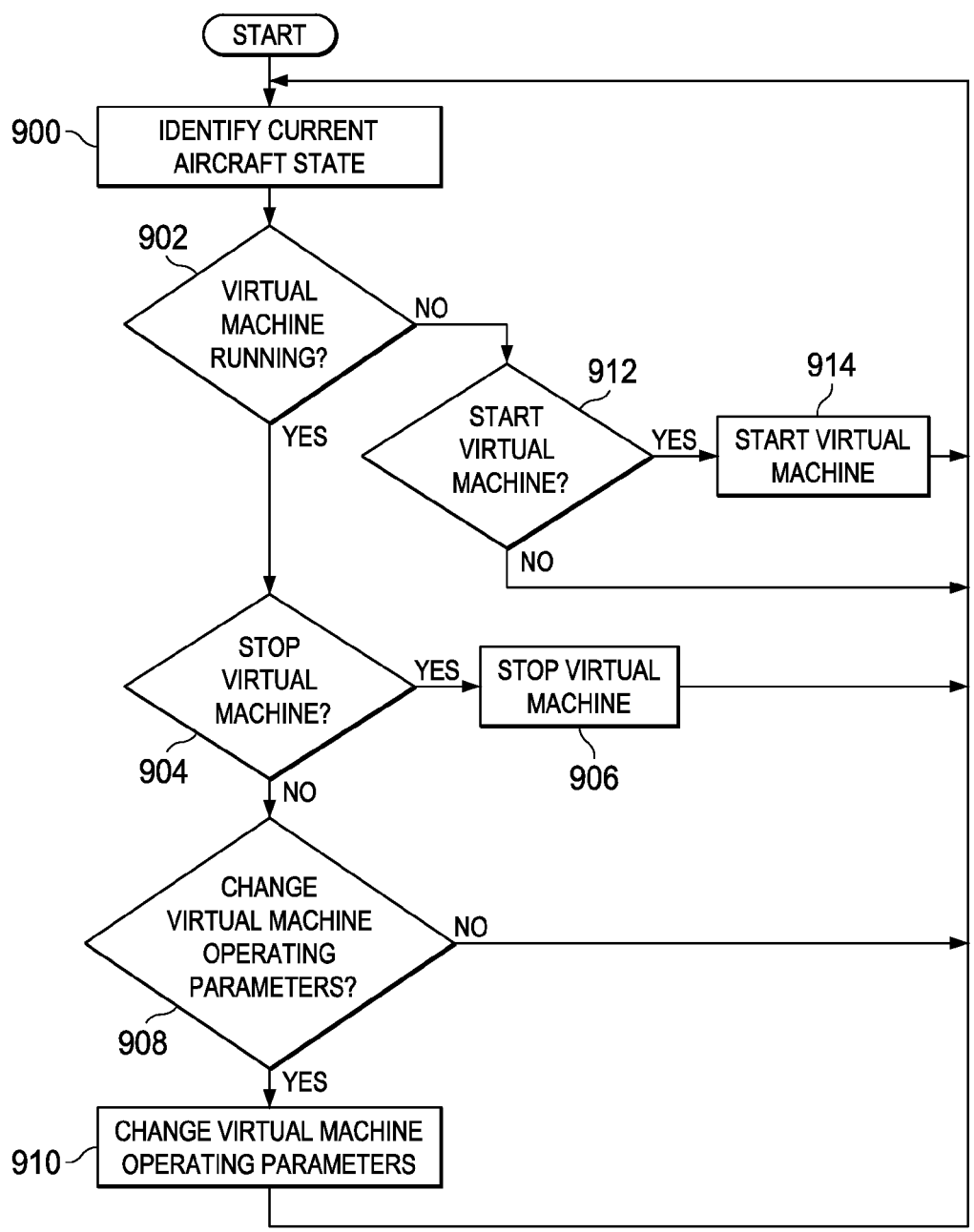
FIG. 9 is an illustration of a flowchart of a process for managing the running of a virtual machine on an aircraft in accordance with an advantageous embodiment.

Turning to FIG. 9, a flowchart of a process for managing running of a virtual machine on an aircraft is depicted in accordance with an advantageous embodiment. The process of FIG. 9 may be implemented, for example, in management module 242 in FIG. 2 using virtual machine management policies 244 in FIG. 2.

The process begins by identifying current aircraft state (operation 900). For example, the aircraft state identified in operation 900 may be a phase of flight or other state of the aircraft. Operation 900 may comprise identifying a change in the current aircraft state from one state to another state. Next, it is determined whether or not a virtual machine is running (operation 902). If it is determined at operation 902 that a virtual machine is running, it is then determined whether or not the virtual machine should be stopped based on the current aircraft state or the change in the current aircraft state and a policy for managing the virtual machine for different states of the aircraft (operation 904). If it is determined at operation 904 that the virtual machine should be stopped, the virtual machine is stopped (operation 906), and the process returns to operation 900 to identify the current aircraft state or a change in the current aircraft state.

If it is determined at operation 904 that the virtual machine should not be stopped, it may be determined whether or not to change the virtual machine operating parameters (operation 908). For example, operation 908 may include determining whether or not to change the virtual machine access to resources or to change some other operating parameter of the virtual machine based on the current aircraft state or the change in the current aircraft state and the policy for managing the virtual machine for different aircraft states.

If it is determined at operation 908 that the virtual machine operating parameters are to be changed, the virtual machine operating parameters are changed (operation 910), with the process returning to operation 900 thereafter. If it is determined at operation 908 that the virtual machine operating parameters are not to be changed, the process returns to operation 900.

Returning to operation 902, if it is determined that the virtual machine is not running, it is determined whether the virtual machine should be started based on the current aircraft state or the change in the current aircraft state and the policy for managing the virtual machine for different aircraft states (operation 912). If it is determined at operation 912 that the virtual machine should be started, the virtual machine is started (operation 914), with the process returning to operation 900 thereafter. Operation 914 may include starting the virtual machine with the operating parameters of the virtual machine, such as the access to system resources allowed the virtual machine, defined by the current aircraft state and the policy for managing the virtual machine for different aircraft states. If it is determined at operation 912 that the virtual machine should not be started, the process returns to operation 900.

The illustration of FIG. 9 is not meant to imply limitations to the manner in which different advantageous embodiments may be implemented. In particular, managing a virtual machine in accordance with an advantageous embodiment may not be limited to starting the virtual machine, stopping the virtual machine, and changing the operating parameters of the virtual machine based on the current aircraft state or a change in the current aircraft state and the policy for managing the virtual machine for different aircraft states.

For example, in one embodiment, it may be determined whether or not to load the virtual machine into transient storage to be run on a processor unit based on the current state of the aircraft and the policy for managing the virtual machine for different aircraft states.

In another embodiment, a virtual machine may be moved from one physical processor unit to another physical processor unit based on a change in the current aircraft state and the policy for managing the virtual machine. For example, the virtual machine may be moved from one physical processor unit to another physical processor unit in response to a change in the aircraft state indicating a load imbalance on the aircraft network data processing system.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

One or more of the advantageous embodiments provides a capability to load and manage the operation of virtual machines in a network data processing system on an aircraft. In accordance with an advantageous embodiment, virtual machines are implemented on an aircraft using various software aircraft parts. The aircraft configuration, therefore, may be maintained in the conventional manner using part number control. Therefore, the advantages provided by the operation of virtual machines in the aircraft may be obtained without changing aircraft maintenance processes and required methodologies for loading software on an aircraft.

One or more of the advantageous embodiments provides a capability to consolidate hardware in a network data processing system on an aircraft. Separation of operations in the aircraft network data processing system may be provided by the virtual machines rather than by the use of separate computer hardware. Advantageous embodiments also provide for hardware consolidation of aircraft maintenance systems.

One or more of the advantageous embodiments also provides a capability to allow aircraft manufacturers and aircraft operators greater flexibility in using software from various sources for operational and maintenance purposes. Developers of applications that are hosted in virtual machines on an aircraft do not need to conform to any special conventions with respect to the operating system services that they use in order to provide for separation of operations in the aircraft network data processing system. Therefore, software application developers have maximum flexibility in implementing desired functions. The underlying virtual machine structure will separate such functions from other operations in the aircraft network data processing system. In this manner, critical operations in the aircraft network data processing system are protected from any inconsistencies in the operation of non-critical software applications that may not be fully certified.

One or more of the advantageous embodiments also provides a capability to operate virtual machines in a network data processing system on an aircraft in a manner that is power-loss safe. At a reboot after a power shutoff, the aircraft network data processing system will come up cleanly. The system need not perform any recovery operations in addition to those that would normally be needed in the absence of virtual machines.

Figure 10:
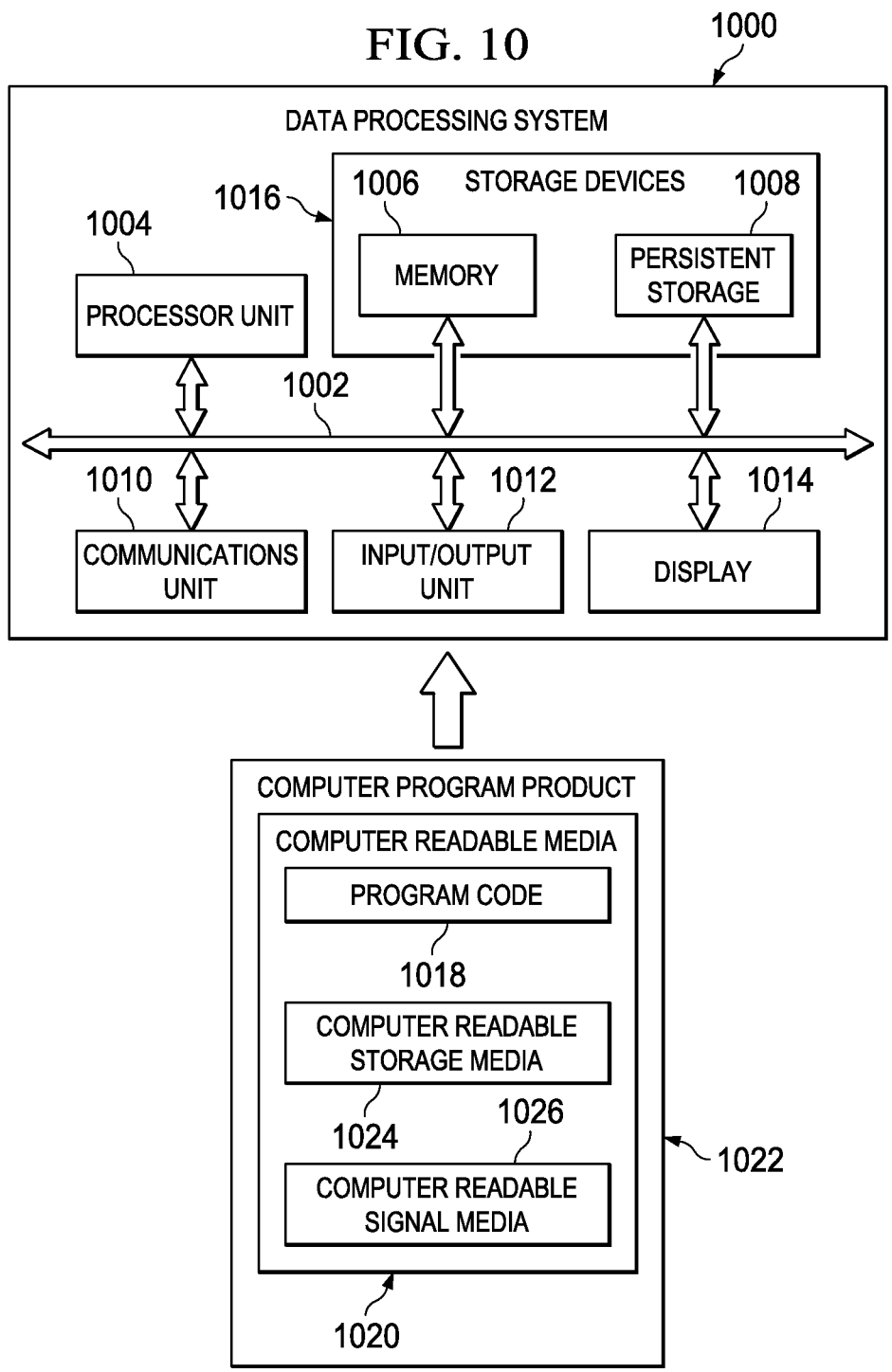
FIG. 10 is an illustration of a data processing system in accordance with an advantageous embodiment.

Turning now to FIG. 10, an illustration of a data processing system is depicted in accordance with an advantageous embodiment. In this example, data processing system 1000 is an example of a data processing system in aircraft network data processing system 216 in FIG. 2. For example, data processing system 1000 is an example of one implementation of line-replaceable units 222 in FIG. 2. In this illustrative example, data processing system 1000 includes communications fabric 1002. Communications fabric 1002 provides communications between processor unit 1004, memory 1006, persistent storage 1008, communications unit 1010, input/output (I/O) unit 1012, and display 1014. In this example, processor unit 1004 is one example of processor units 224 in FIG. 2 or of processor unit 300 in FIG. 3. Memory 1006, persistent storage 1008, communications unit 1010, input/output (I/O) unit 1012, and display 1014 are examples of resources accessible by processor unit 1004 via communications fabric 1002.

Processor unit 1004 serves to execute instructions for software that may be loaded into memory 1006. Processor unit 1004 may be a number of processors, a multi-processor core, or some other type of processor, depending on the particular implementation. Further, processor unit 1004 may be implemented using a number of heterogeneous processor systems in which a main processor is present with secondary processors on a single chip. As another advantageous example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these advantageous examples, the instructions are in a functional form on persistent storage 1008. These instructions may be loaded into memory 1006 for execution by processor unit 1004. The processes of the different embodiments may be performed by processor unit 1004 using computer-implemented instructions, which may be located in a memory, such as memory 1006.

These instructions are referred to as program instructions, program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026.

Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000.

In these examples, computer readable storage media 1024 is a physical or tangible storage device used to store program code 1018 rather than a medium that propagates or transmits program code 1018. Computer readable storage media 1024 is also referred to as a computer readable tangible storage device or a computer readable physical storage device. In other words, computer readable storage media 1024 is a media that can be touched by a person.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different advantageous embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, data processing system 1000 may include organic components integrated with inorganic components and/or may be comprised entirely of organic components excluding a human being. For example, a storage device may be comprised of an organic semiconductor.

In another advantageous example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system.

Additionally, communications unit 1010 may include a number of devices that transmit data, receive data, or transmit and receive data. Communications unit 1010 may be, for example, a modem or a network adapter, two network adapters, or some combination thereof.

Further, a memory may be, for example, memory 1006, or a cache, such as found in an interface and memory controller hub that may be present in communications fabric 1002.

The description of the different advantageous embodiments has been presented for purposes of illustration and description and is not intended to be exhaustive or to limit the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for operating a network data processing system on an aircraft comprising:
   performing a number of operations in a virtual machine on the aircraft, wherein the virtual machine runs on a processor unit in the network data processing system on the aircraft to create a simulated computer environment and wherein the virtual machine accesses resources of the processor unit for performing the number of operations using a host operating system on the processor unit;
   identifying, by the network data processing system, a change in a current state of the aircraft, wherein identifying the change in the current state of the aircraft comprises identifying at least one of a change in a phase of flight of the aircraft, a change in a location of the aircraft, a change in engine conditions, a change in cabin conditions, and a change in conditions outside of the aircraft;
   managing the running of the virtual machine responsive to and based on the change in the current state of the aircraft and based on a policy for managing the virtual machine for different states of the aircraft; and
   wherein managing the running of the virtual machine comprises, responsive to identifying the current state of the aircraft as a first state and based on a policy for not running the virtual machine for the first state, stopping the virtual machine without stopping the host operating system and starting the virtual machine responsive to identifying the current state of the aircraft as a second state and based on a policy for running the virtual machine for the second state.

2. The method of claim 1, wherein managing the running of the virtual machine comprises changing operating parameters of the virtual machine responsive to and based on the change in the current state of the aircraft.

3. The method of claim 1, wherein:
   the virtual machine and a number of other virtual machines form a virtual network; and
   managing the running of the virtual machine comprises changing a configuration of the virtual network based on the current state of the aircraft and based on a policy for managing the virtual network for the different states of the aircraft.

4. The method of claim 1, wherein:
   the host operating system is a first software aircraft part loaded into transient storage in the network data processing system on the aircraft, wherein software aircraft parts loaded into the transient storage are lost when the network data processing system is shut down;
   the virtual machine creates the simulated computer environment using a number of second software aircraft parts loaded into the transient storage;
   the number of operations are performed using a number of third software aircraft parts loaded into the transient storage;
   the number of second software aircraft parts comprise a virtual machine template software aircraft part configured to provide virtual machine functions usable in a number of virtual machines having different configurations and a configuration software aircraft part comprising a configuration for the virtual machine; and
   the virtual machine comprises an instance of the virtual machine template software aircraft part having a configuration defined by the configuration software aircraft part.

5. The method of claim 1, wherein:
   the virtual machine and a number of other virtual machines form a virtual network; and
   managing the running of the virtual machine comprises changing a configuration of the virtual network based on the current state of the aircraft.

6. An apparatus comprising:
   a first software aircraft part on a network data processing system on an aircraft, wherein the first software aircraft part is a host operating system;
   a number of second software aircraft parts on the network data processing system, the number of second software aircraft parts configured to create a virtual machine;
   a number of third software aircraft parts on the network data processing system, the number of third software aircraft parts configured to perform a number of operations;
   a processor unit on the network data processing system configured to perform the number of operations in the virtual machine, wherein the virtual machine is configured to run on the processor unit to create a simulated computer environment and to access resources of the processor unit for performing the number of operations using the host operating system on the processor unit; and
   a management module on the network data processing system configured to manage the running of the virtual machine responsive to and based on a change in a current state of the aircraft and based on a policy for managing the virtual machine for different states of the aircraft, herein the change in the current state of the aircraft comprises at least one of a change in a phase of flight of the aircraft, a change in a location of the aircraft, a change in engine conditions, a change in cabin conditions, and a change in conditions outside of the aircraft wherein the management module is configured to stop the virtual machine without stopping the host operating system responsive to identifying the current state of the aircraft as a first state and based on a policy for not running the virtual machine for the first state and start the virtual machine responsive to identifying the current state of the aircraft as a second state and based on a policy for running the virtual machine for the second state.

7. The apparatus of claim 6, wherein:
the virtual machine and a number of other virtual machines form a virtual network; and
the management module is configured to manage a configuration of the virtual network based on the current state of the aircraft and a policy for managing the virtual network for the different states of the aircraft.

8. The apparatus of claim 6, wherein the management module is configured to change an operating parameter of the virtual machine based on the change in the current state of the aircraft and the policy for managing the virtual machine for the different states of the aircraft.

9. The apparatus of claim 6, wherein:
the number of second software aircraft parts comprise a virtual machine template software aircraft part configured to provide virtual machine functions usable in a number of virtual machines having different configurations and a configuration software aircraft part comprising a configuration for the virtual machine; and
the virtual machine comprises an instance of the virtual machine template software aircraft part having the configuration defined by the configuration software aircraft part.

10. A method for operating a network data processing system on an aircraft comprising:
loading a first software aircraft part comprising a host operating system for a processor unit in the network data processing system on the aircraft;
loading a second software aircraft part comprising a virtual machine template in the network data processing system on the aircraft, the second software aircraft part configured to provide virtual machine functions usable in a number of virtual machines having different configurations;
loading a number of third software aircraft parts in the network data processing system on the aircraft, the number of third software aircraft parts configured to perform a number of operations;
running the host operating system and the virtual machine on the processor unit in the network data processing system on the aircraft from the first and the second software aircraft parts;
performing the number of operations in the virtual machine using the number of third software aircraft parts, wherein the virtual machine is configured to access resources of the processor unit for performing the number of operations using the host operating system on the processor unit, wherein the virtual machine and a number of other virtual machines form a virtual network;
identifying, by the network data processing system, a change in a current state of the aircraft, wherein the change in the current state of the aircraft comprises at least one of a change in a phase of flight of the aircraft, a change in a location of the aircraft, a change in engine conditions, a change in cabin conditions, and a change in conditions outside of the aircraft;
managing a configuration of the virtual network responsive to and based on the change in the current state of the aircraft; and
managing the running of the virtual machine responsive to and based on the change in the current state of the aircraft and based on a policy for managing the virtual machine for different states of the aircraft wherein managing the running of the virtual machine comprises stopping the virtual machine without stopping the host operating system responsive to identifying the current state of the aircraft as a first state and based on a policy for not running the virtual machine for the first state and starting the virtual machine responsive to identifying the current state of the aircraft as a second state and based on a policy for running the virtual machine for the second state.

11. The method of claim 10, wherein:
managing the running of the virtual machine comprises managing the configuration of the virtual network; and
managing the configuration of the virtual network is responsive to and based on the change in the current state of the aircraft and based on a policy for managing the virtual network for the different states of the aircraft.

\* \* \* \* \*